No. 636,792. Patented Nov. 14, 1899.
O. H. GENTRY.
BICYCLE.
(Application filed May 25, 1897.)

(No Model.) 2 Sheets—Sheet 1.

WITNESSES:
J. Howard
J. S. Lockwood

INVENTOR
Oliver H. Gentry
by
A. P. Thayer
ATTORNEY

THE NORRIS PETERS CO., PHOTO-LITHO., WASHINGTON, D. C.

No. 636,792. Patented Nov. 14, 1899.
O. H. GENTRY.
BICYCLE.
(Application filed May 25, 1897.)
(No Model.) 2 Sheets—Sheet 2.
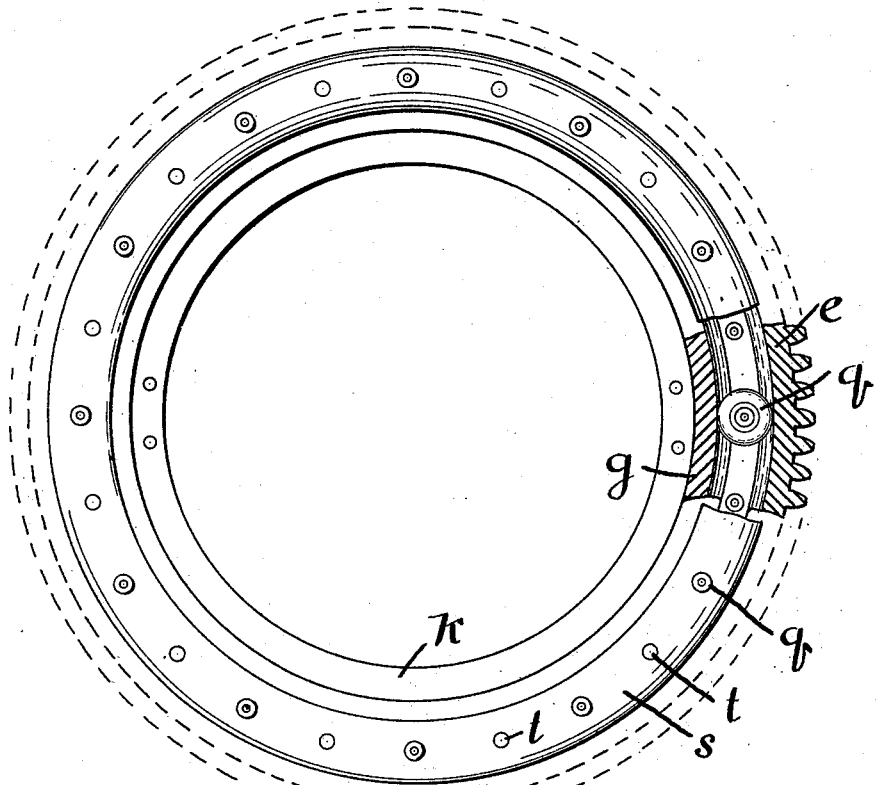
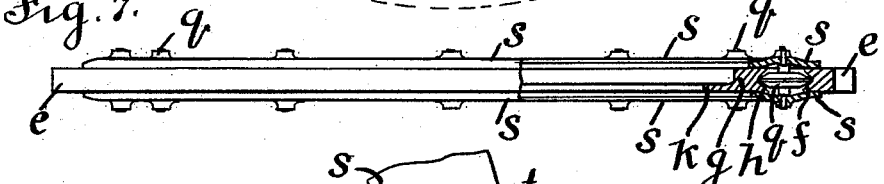
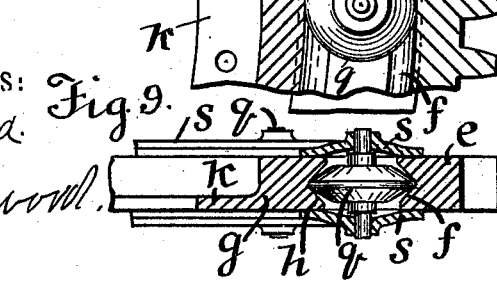
WITNESSES:
J. Howard.
J. S. Lockwood.
INVENTOR
Oliver H. Gentry
BY
A. P. Thayer
ATTORNEY

UNITED STATES PATENT OFFICE.

OLIVER H. GENTRY, OF NEW YORK, N. Y.

BICYCLE.

SPECIFICATION forming part of Letters Patent No. 636,792, dated November 14, 1899.

Application filed May 25, 1897. Serial No. 638,126. (No model.)

*To all whom it may concern:*

Be it known that I, OLIVER H. GENTRY, a citizen of the United States, and a resident of New York, (Brooklyn,) in the county of Kings and State of New York, have invented certain new and useful Improvements in Bicycle Driving-Gear, of which the following is a specification.

My invention relates to an improved power-transmitting mechanism particularly well adapted for use on bicycles.

In accordance with this invention the power-transmitting mechanism comprises a driving-wheel, a wheel substantially in line therewith to be driven thereby, and an intermediate wheel to transmit power from the driving-wheel to the driven wheel and which consists of an inner part, center, or support, a circumferential ring encircling the said center or support, but separate therefrom, with rollers in a race formed in the two rings and confining said toothed ring on the stationary ring, and spacing-rings in which the rollers are pivoted, said spacing-rings forming guards to the roller-race, said rollers confining the toothed ring on the supporting-ring.

The driving and driven wheels and the intermediate circumferential ring may and preferably will be made as spur-gears, and the support or center of the intermediate wheel may and preferably will be as an open frame or ring to enable my improved power-transmitting mechanism to be readily applied to the frames of bicycles as now commonly constructed. These and other features of my invention will be pointed out in the claim at the end of the specification.

Figure 1:
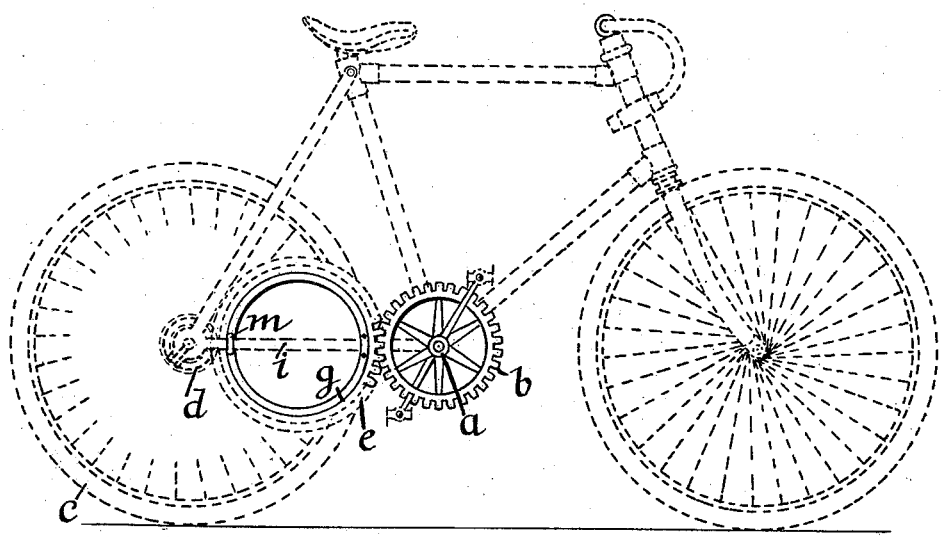
Figure 2:
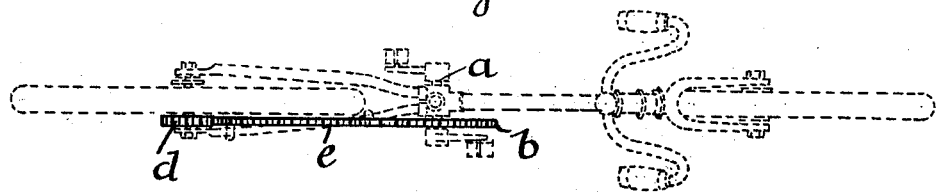
Figures 3, 4, 5:
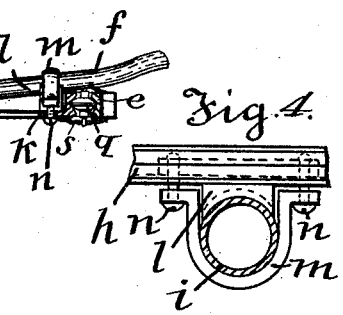

Figure 1 is a side elevation of a bicycle in dotted lines, with my improved driving-gear mostly represented in full lines. Fig. 2 is a plan view in similar representation. Fig. 3 is a horizontal section of my improved intermediate gear and plan of one of the bars of the hind fork and one form of means of attaching said gear, the scale being considerably enlarged. Figs. 4 and 5 are details of devices for securing the stationary ring of the intermediate gear to the frame-bar. Fig. 6 is an elevation, partly in side view and partly in section, of the supporting-ring and intermediate wheel on a larger scale for greater clearness. Fig. 7 is a plan view of the parts shown in Fig. 6, also with a part in section. Figs. 8, 9, and 10 are detail sections of the parts shown in Fig. 6 on a still larger scale.

In the present instance I have shown what I regard as the preferred form of my invention as applied to a bicycle-frame of ordinary construction.

On the crank-axle $a$ is a spur-wheel $b$, and on the axle of the driving-wheel $c$ of the bicycle is a spur-pinion $d$ in the same plane for being geared together by an intermediate spur-wheel. For this intermediate wheel I provide the spur-toothed ring $e$, preferably having the groove $f$ in its inner periphery for part of a roller-race, and for mounting this ring I provide a center or support, preferably another ring $g$, the diameter of which is slightly less than the inner diameter of the toothed ring and having preferably a groove $h$ in its outer face for the counterpart of the roller-race, and for the best result I attach this ring fixedly to the frame-bar $i$ in any approved way to support it in the plane of the wheel $b$ and pinion $d$, and on the stationary ring $g$ I mount the toothed ring $e$ by means of rollers $q$ inserted in the rings and comprising a roller-bearing of the toothed ring on the stationary ring. The size of the toothed ring is such as to mesh properly with wheel $b$ and pinion $d$ when so mounted to transmit the motion.

The ring $g$, as shown, has an inwardly-ranging flange $k$ for stiffening it against the thrusts of the rollers and for connecting it to the frame-bar $i$. The plan which I represent in this case for connecting said ring comprises a shoe-block $l$, flat on one side and grooved on the other to fit the flange and frame-bar, respectively, and suitably interposed between them, with a yoke $m$ extending around the bar and being suitably adapted for receiving clamping-screws $n$, inserted through the flange to clamp the several parts together; but the mode of connection may be varied at will—for instance, the yoke may have screw-threaded terminals inserted through the flange and secured by nuts screwed on the outside. Two such fastenings at opposite sides of the stationary ring and in the line of the frame-bar are ample for effectual security of the intermediate wheel, and it is not essential that the grip on the frame-bar be great, because any tendency of the wheel to move forward or backward along the frame-bar is balanced equally both ways by the opposing thrusts of the wheel $b$ and pinion $d$, and the parallel faces of the teeth tend to keep the intermediate gear in the plane of the other two gears, even though the fastenings be so slack on the bar as to turn easily thereon. It will be seen that an intermediate wheel fastened in this manner is held more substantially than a wheel of the ordinary kind to turn on a central axis, where the stresses are multiplied by the radius of the wheel, and a special and most important function of this contrivance is its adaptation for application to the ordinary side bar of the lower hind fork of nearly all forms of bicycles now in use without any change whatever and without expensive fittings, the application being such that the obliquely-arranged frame-bar extends diagonally through the rings, while the rings occupy the plane of the crank-wheel and pinion parallel to the vertical longitudinal plane of the entire machine, this being an arrangement impossible with the ordinary wheels rotating on their axes, for which specially-constructed frames must be provided.

The rollers are pivoted in spacing-rings $s$ to keep the rollers apart from each other and also for dust-guards to exclude dust from the race, said rings being formed of thin sheet circular strips of sufficient width to overlap the sides of the toothed rings, and between the rollers the two rings may be coupled by spacing-studs $t$ to confine them in proper relation with the grooved rings and rollers.

In applying the rings to a bicycle previously completed the frame will be parted suitably for inserting the bar $i$ and be closed again. In this application to bicycles being constructed the bar $i$ will be inserted prior to the closing of the frame.

What I claim as my invention is—

In a bicycle driving-gear, the combination with a spur driving-wheel on the crank-axle and a spur-pinion on the driving-wheel axle, of an intermediate transmitting spur-wheel comprising a toothed ring gearing with said wheel and pinion and mounted on a stationary ring with rollers in a race formed in the two rings and confining said toothed ring on the stationary ring, and spacing-rings in which the rollers are pivoted, said spacing-rings forming guards to the roller-race substantially as described.

Signed at New York, in the county of New York and State of New York, this 22d day of May, A. D. 1897.

OLIVER H. GENTRY.

Witnesses:
C. SEDGWICK,
A. P. THAYER.